United States Patent
Johnson

(10) Patent No.: US 11,334,674 B2
(45) Date of Patent: May 17, 2022

(54) END POINT IDENTIFICATION

(71) Applicant: HEWLETT PACKARD ENTERPRISE DEVELOPMENT LP, Houston, TX (US)

(72) Inventor: Christopher Johnson, Fort Collins, CO (US)

(73) Assignee: Micro Focus LLC, Santa Clara, CA (US)

( * ) Notice: Subject to any disclaimer, the term of this patent is extended or adjusted under 35 U.S.C. 154(b) by 909 days.

(21) Appl. No.: 15/318,868

(22) PCT Filed: Jul. 24, 2014

(86) PCT No.: PCT/US2014/048063
§ 371 (c)(1),
(2) Date: Dec. 14, 2016

(87) PCT Pub. No.: WO2016/014068
PCT Pub. Date: Jan. 28, 2016

(65) Prior Publication Data
US 2017/0132423 A1    May 11, 2017

(51) Int. Cl.
*G06F 21/60* (2013.01)
*G06F 21/31* (2013.01)
*H04L 29/06* (2006.01)

(52) U.S. Cl.
CPC ............ *G06F 21/604* (2013.01); *G06F 21/31* (2013.01); *H04L 63/08* (2013.01)

(58) Field of Classification Search
CPC ......... G06F 21/604; G06F 21/31; H04L 63/08

USPC .......................................................... 726/2
See application file for complete search history.

(56) References Cited

U.S. PATENT DOCUMENTS

| | | | |
|---|---|---|---|
| 6,073,242 A | 6/2000 | Hardy et al. | |
| 6,385,724 B1 | 5/2002 | Beckman et al. | |
| 7,225,256 B2* | 5/2007 | Villavicencio | H04L 63/08 707/999.1 |
| 7,526,548 B2* | 4/2009 | Tsuyama | H04N 7/163 709/217 |
| 7,765,298 B2 | 7/2010 | Villavicencio | |
| 8,104,071 B2* | 1/2012 | Monjas Llorente | H04L 63/102 726/3 |

(Continued)

OTHER PUBLICATIONS

A. Ahmad and B. Whitworth, "Access control taxonomy for social networks," 2011 7th International Conference on Information Assurance and Security (IAS), 2011, pp. 256-261, doi: 10.1109/ISIAS.2011.6122829. (Year: 2011).*

(Continued)

*Primary Examiner* — Jeremy S Duffield
*Assistant Examiner* — Sameera Wickramasuriya

(57) ABSTRACT

In some examples, a system provides an agency identifier identifying an authority relationship between a first identity and a second identity, provides a duty identifier based on the agency identifier and a first end point, identifies a second end point based on the first end point, associates authority to access the second end point with the duty identifier, and accesses the second service at the second end point, the accessing comprising an entity identified by the second identity accessing the second end point on behalf of an entity identified by the first identity based on the authority relationship.

20 Claims, 5 Drawing Sheets

(56) References Cited

U.S. PATENT DOCUMENTS

| | | | | |
|---|---|---|---|---|
| 8,365,254 | B2* | 1/2013 | Burke | G06F 21/604 726/21 |
| 8,495,384 | B1 | 7/2013 | DeLuccia | |
| 8,561,156 | B2* | 10/2013 | Matsuda | G06F 21/6218 726/6 |
| 8,769,642 | B1* | 7/2014 | O'Neill | H04L 63/10 726/1 |
| 8,931,057 | B2* | 1/2015 | Cicchitto | G06F 21/604 726/4 |
| 8,955,037 | B2* | 2/2015 | Srinivasan | G06F 21/6236 726/1 |
| 8,955,041 | B2* | 2/2015 | Esaki | H04L 63/08 726/1 |
| 2007/0089167 | A1* | 4/2007 | Villavicencio | H04L 63/08 726/5 |
| 2008/0052775 | A1 | 2/2008 | Sandhu et al. | |
| 2010/0125511 | A1* | 5/2010 | Jouret | G06F 21/10 705/26.1 |
| 2010/0306830 | A1* | 12/2010 | Hardt | G06F 21/33 726/4 |
| 2011/0239275 | A1 | 9/2011 | De Peuter et al. | |
| 2013/0036459 | A1* | 2/2013 | Liberman | H04L 9/0866 726/6 |
| 2014/0280932 | A1* | 9/2014 | Braun | H04L 63/10 709/225 |
| 2014/0304837 | A1* | 10/2014 | Mogaki | G06F 21/33 726/28 |
| 2015/0189041 | A1* | 7/2015 | Wang | H04L 67/306 709/204 |

OTHER PUBLICATIONS

IBM, "Integrated Identity and Access Management Governance White Paper," (Web Page), Jul. 21, 2014, 11 pages, available at https://www.ibm.com/developerworks/community/wikis/home?lang=en#!/wiki/Tivoli+Identity+Manager/page/Integrated+Identity+And+Access+Management+Governance.

International Search Report & Written Opinion received in PCT Application No. PCT/US2014/048063, dated Mar. 11, 2015, 13 pages.

Microsoft, "Chapter 6: Impersonation and Delegation in WCF," (Web Page), 2014, 8 pages, available at http://msdn.microsoft.com/en-us/library/ff649252.aspx.

Ping Identity Corporation, "PingOne Cloud Identity and Access Management," (Web Page), 4 pages, retrieved online Jul. 22, 2014 at https://www.pingidentity.com/en/products/pingone.html.

Ping Identity Corporation, "Web Access Management That Does More With Less," (Web Page), 4 pages, retrieved online Jul. 22, 2014 at https://www.pingidentity.com/en/products/pingaccess.html.

Progress Software Corporation, "Proxy User," (Web Page), Mar. 24, 2014, 1 page, available at http://media.datadirect.com/download/docs/odbc/allodbc/index.html#page/userguide/mam1392995897598.html.

Michael McCune, Github—Delegating Keystone trusts through the ReST API, https://elmiko.github.io/2014/06/10/keystone-trust-delegation.html, Jun. 10, 2014 (10 pages).

* cited by examiner

END POINT IDENTIFICATION

BACKGROUND

Information technology ("IT") services are commonly offered in a catalog to perform supportive functions. For example, IT services may allow a user to order a computer and other materials for productivity. A service can be fulfilled by a remote service fulfillment system or multiple remote service fulfillment systems. The remote fulfillment system can be interacted with using an application programming interface ("API"). In order to fulfill these services and retain permissions and accountability, the concept of user identity is used throughout the fulfillment process.

DETAILED DESCRIPTION

In the following description and figures, some example implementations of identity management systems and/or methods of ostensible impersonation are described. Identity management systems generally administrate over entities of a system, such as a system providing a service. Identity management systems can generally establish roles and manage access privileges of individual users. Some individuals may try to execute a module or function and may not have the correct permissions. For example, a user role may not be allowed to interact directly with the operating system and an administrative role may be used to perform functions associated with the operating system.

One form of completing tasks that utilize permissions that an identity may not have is through impersonation of an identity that does have the permissions. An identity can be impersonated by providing appropriate criteria to authenticate and authorize the identity. The authorization for impersonation can change the role of the identity, provide temporary permissions, or otherwise modify accessibility to modules or functionality.

Various examples described below relate to providing ostensible impersonation based on an agency relationship between a first identity and a second identity. The impersonation can be extended from a service to a second service based on the relationship between the services. A service can be made available at an end point. An end point, as used herein, is location for accessing a service, such as destination represented by a uniform resource locator ("URL"). For example, a service can be interacted with by accessing the end point associated with the service. Using a duty associated with the agency relationship, the second identity can act on behalf of the first entity when accessing a second end point when a first end point was identified with the agency relationship. Thereby, the second identity can continue to act on behalf of the user for actions involving additional services based on a direct authorization associated with a first service. In this manner, impersonation can become ostensible and allow the impersonation to continue for services that request identity specific actions, such as a service-specific account.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, update, and/or modify" (or appropriate variations thereof).

Figure 1:
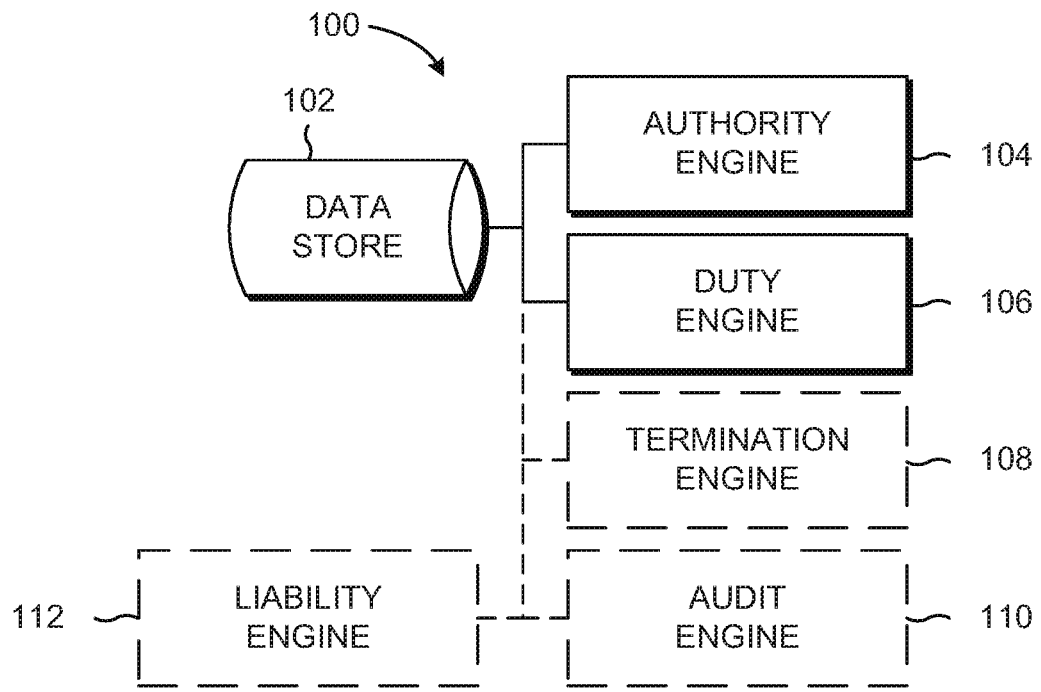
FIGS. 1 and 2 are block diagrams depicting example identity management systems.
Figure 2:
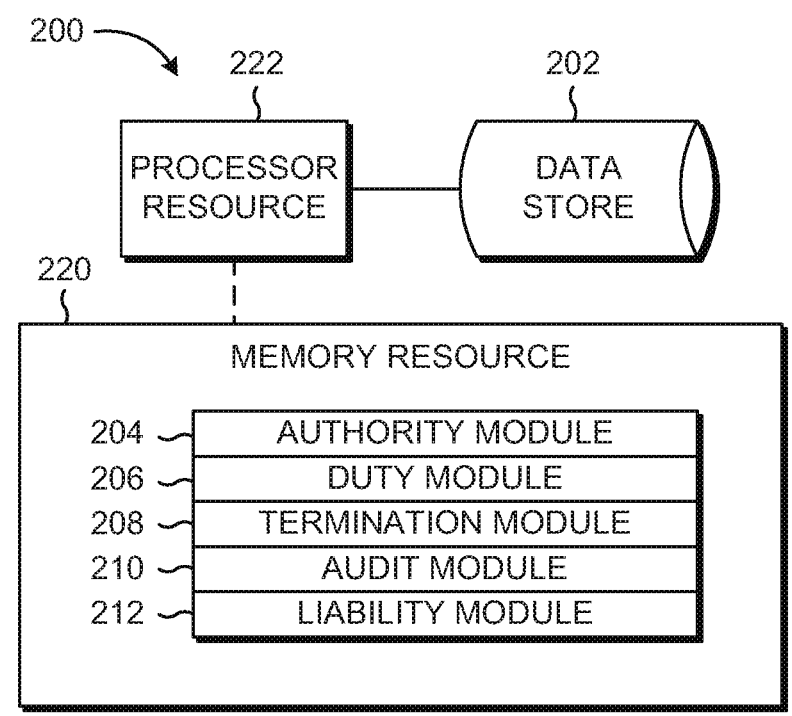

FIGS. 1 and 2 are block diagrams depicting example identity management systems. Referring to FIG. 1, the example identity management system 100 of FIG. 1 generally includes a data store 102, an authority engine 104 and a duty engine 106. In general, the duty engine 106 can identify a duty performable within the scope of the agency relationship provided by the authority engine 104. The example identity management system 100 can include a termination engine 108, an audit engine 110, and a liability engine 112 to generally assist in delimiting the scope of extensibility of the agency relationship and tracking the actions performed by the second identity on behalf of the first identity. The identity management system 100 can be used to extend authority to related services using impersonation. One example of impersonation is providing authorization to one service to act on behalf of a user. Another example of impersonation is using a portal to a catalog of services, such as IT services, where authorization is provided at the portal and extended to each service selected.

The authority engine 104 represents any circuitry or combination of circuitry and executable instructions to provide an agency identifier based on an authority relationship. For example, the authority engine 104 can create a relationship between a first entity and a second entity and provide an identifier associated with the relationship for a service call and/or relationship flow. The authority relationship can include an authorization to access a service on behalf of the first entity. The relationship between entities can be discussed as an agency relationship between a principal and an agent. For example, a principal can be a service account for which the relationship will act on behalf of (i.e. the impersonatee) and an agent can be the service account that will act on behalf of the principal (i.e. the impersonator). The entities having identities can be users or service accounts. Allowing a principal to be a service account can allow for chains of authority relationships to be created. In this manner, the present disclosure contemplates any number of service end points and any number of agent entities to be authorized to act on behalf of the principal to access those service end points.

The agency identifier provided by the authority engine 104 can provide a reference to associate the authority relationship with the duties, limits, liabilities, and audits of an agent to act in behalf of a principal. The agency identifier can be a number, value, string, label, class, category, vector, or any other data capable of identifying a relationship between identities.

The duty engine 106 represents any circuitry or combination of circuitry and executable instructions to provide a duty identifier based on an agency identifier and a first end point, identify a second end point based on the first end point, and associate authority to access the second end point with the duty identifier. For example, the duty engine 106 can receive as inputs an agency identifier from the authority engine 104 and a service end point and provide as output a duty identifier associated with a plurality of service end points. The duty identifier defines authorization to interact with a service provided at a designated end point associated with the service. The duty engine 106 can define what services can be interacted with based on providing the duty identifier. Thus, an end point can recognize an identity's relationship and allowable actions based on the agency identifier and the duty identifier.

The duty engine 106 can identify a second end point based on one of a mapping of a plurality of end points and a semantic selection of services. For example, the duty engine 106 can receive a mapping of composite service end points (i.e. a service end point that utilizes other end points to complete a service) and calculate potential service end points based on the end point supplied to the duty engine 106. For another example, the duty engine 106 can relate a first service end point to additional service end points based on the semantic context of the request, such as a request to purchase a laptop computer can have a semantic association with a laptop catalog service, a warranty offering service, and a payment service. In this manner, ostensible authority can be calculated and associated with the duty relationship between a first identity and a second identity based on a duty identifier. The duty engine 106 can also receive a certificate, a token, or other authorization mechanism to identify the authenticity of the agency relationship and/or authorization to access a service end point.

The termination engine 108 represents any circuitry or combination of circuitry and executable instructions to provide a termination end point based on the agency identifier. For example, the termination engine 108 can receive an agency relationship identifier, a maximum relationship age, and a termination definition including a condition that, when satisfied, causes the relationship between a first entity and a second entity to terminate. The termination engine 108 can configure the system with automatic termination triggers and/or a kill switch for the principal to end an action of the agency on the principal's behalf. The termination end point is a place the first entity can go to terminate the agency relationship. For example, a web portal can provide a list of termination end points associated with a user account where each termination end point is associated with a service offered at the web portal.

The termination engine 108 can receive a termination data structure. The termination data structure may be used to define the limits of termination of an agency relationship between a first entity and a second entity. The termination data structure can include a service end point and a termination condition associated with an end point. A termination condition can include a service end point, an action performable at a service end point, data verification, or other expression capable of being compared to a state of action of an entity.

The audit engine 110 represents any circuitry or combination of circuitry and executable instructions to maintain a history of actions performed by the second entity on behalf of the first identity and provide an action performed by the second identity on behalf of a first entity based on the agency identifier. For example, the actions performed by entities may be logged and the entries associated with actions by a first entity can be organized by the agency identifier representing the actions performed on behalf of a second entity. For another example, the audit engine 110 can receive an agency identifier as input and output actions performed by a first identity on behalf of a second identity, the service end point at which each action was performed, and the time of each action.

The liability engine 112 represents any circuitry or combination of circuitry and executable instructions to provide an approved action of a service and a potential impact based on the agency identifier and the duty identifier. For example, the liability engine 112 can receive an agency identifier and a duty identifier as input and output the information related to what the received relationship (identifiable by the agency identifier and/or duty identifier) is allowed to do and the potential impact. For another example, designated duties and ostensible duties identified by the duty engine 106 are placed in a format that would describe the allowable service end points and actions performable by an agent entity on behalf of a principal entity. For example, an agency identifier can be used as an input parameter to a report function to list actions of the associated relationship.

The data store 102 can contain information utilized by the engines 104, 106, 108, 110, and 112. For example, the data store 102 can store an agency identifier, a duty identifier, a composite end point map, a semantic ontology, and a termination data structure.

FIG. 2 depicts the example identity management system 200 can be implemented on a memory resource 220 operatively coupled to a processor resource 222. The processor resource 222 can be operatively coupled to a data store 202. The data store 202 can be the same as the data store 102 of FIG. 1.

Referring to FIG. 2, the memory resource 220 can contain a set of instructions that are executable by the processor resource 222. The set of instructions can implement the system 200 when executed by the processor resource 222. The set of instructions stored on the memory resource 220 can be represented as an authority module 204, a duty module 206, a termination module 208, an audit module 210, and a liability module 212. The processor resource 222 can carry out a set of instructions to execute the modules 204, 206, 208, 210, 212, and/or any other appropriate operations among and/or associated with the modules of the system 200. For example, the processor resource 222 can carry out a set of instructions to identify a plurality of end points based on a service destination, associate the plurality of end points with an authority relationship between a first identity and a second identity using a duty identifier, and provide the duty identifier. For another example, the processor resource 222 can carry out a set of instructions to identify a separate end point related to a designated service destination, authorize access to the separate end point for an agency identifier, determine actions performable at the separate end point, and provide an agency identifier and a list of allowed actions associated with the agency identifier. The authority module 204, the duty module 206, the termination module 208, the audit module 210, and the liability module 212 represent program instructions that when executed function as the authority engine 104, the duty engine 106, the termination engine 108, the audit engine 110, and the liability engine 112 of FIG. 1, respectively.

The processor resource 222 can be any appropriate circuitry capable of processing (e.g. compute) instructions. For example, the processor resource 222 can be a central processing unit ("CPU") that enables identity management by fetching, decoding, and executing modules 204, 206, 208, 210, and 212. Example processor resources 222 include CPUs, semiconductor-based microprocessors, application specific integrated circuits ("ASIC"), a field-programmable gate array ("FPGA"). The processor resource 222 can be one or multiple processing elements capable of retrieving instructions from the memory resource 220 and executing those instructions. Such multiple processing elements can be integrated in a single device or distributed across devices. The processor resource 222 can process the instructions serially, concurrently, or in partial concurrence.

The memory resource 220 and the data store 202 represent a medium to store data utilized and/or produced by the system 200. The medium can be any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine readable, such as computer readable. The medium can be an electronic, magnetic, optical, or other physical storage device that is capable of containing (i.e. storing) executable instructions. The memory resource 220 can be said to store program instructions that when executed by the processor resource 222 implements the system 200 of FIG. 2. The memory resource 220 can be integrated in the same device as the processor resource 222 or it can be separate but accessible to that device and the processor resource 222. The memory resource 220 can be distributed across devices. The memory resource 220 and the data store 202 can represent the same physical medium or separate physical mediums. The data of the data store 202 can include representations of data and/or information mentioned herein.

In the discussion herein, the engines 104, 106, 108, 110, and 112 of FIG. 1 and the modules 204, 206, 208, 210, and 212 of FIG. 2 have been described as circuitry or a combination of circuitry and executable instructions. Such components can be implemented in a number of fashions. Looking at FIG. 2, the executable instructions can be processor executable instructions, such as program instructions, stored on the memory resource 220, which is a tangible, non-transitory computer readable storage medium, and the circuitry can be electronic circuitry, such as processor resource 222, for executing those instructions. The instructions residing on the memory resource 220 can comprise any set of instructions to be executed directly (such as machine code) or indirectly (such as a script) by the processor resource 222.

In one example, the executable instructions can be part of an installation package that when installed can be executed by the processor resource 222 to implement the system 200. In that example, the memory resource 220 can be a portable medium such as a compact disc, a digital video disc, a flash drive, or memory maintained by a computer device, such as a service device 334 of FIG. 3, from which the installation package can be downloaded and installed. In another example, the executable instructions can be part of an application or applications already installed. The memory resource 220 can be a non-volatile memory resource such as read only memory ("ROM"), a volatile memory resource such as random access memory ("RAM"), a storage device, or a combination thereof. Example forms of a memory resource 220 include static RAM ("SRAM"), dynamic RAM ("DRAM"), electrically erasable programmable ROM ("EEPROM"), flash memory, or the like. The memory resource 220 can include integrated memory such as a hard drive ("HD"), a solid state drive ("SSD"), or an optical drive.

Figure 3:
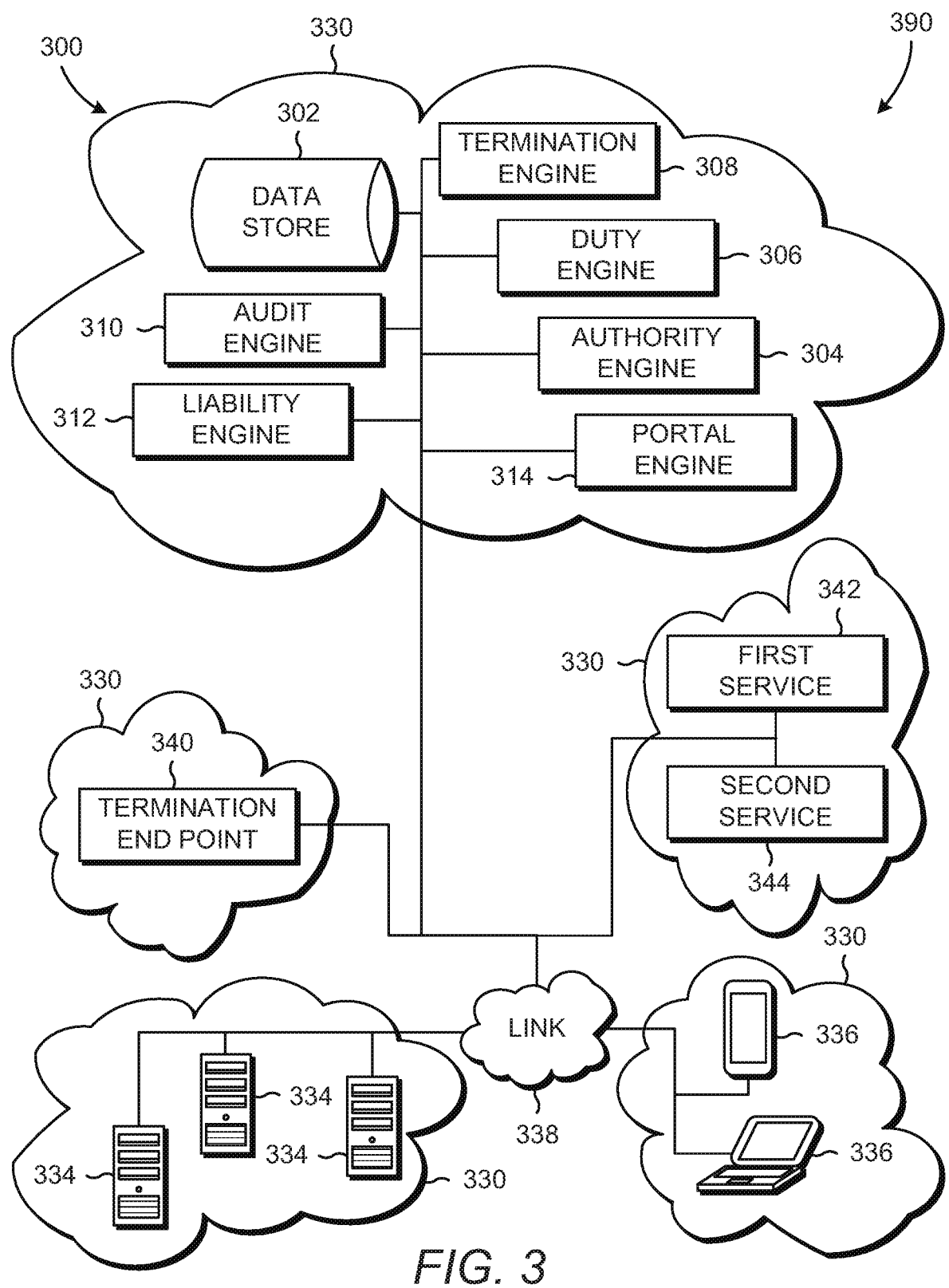
FIG. 3 depicts an example environment in which various identity management systems can be implemented

FIG. 3 depicts example environments in which various example identity management systems can be implemented. The example environment 390 is shown to include an example system 300 for managing ostensible impersonation. The system 300 (described herein with respect to FIGS. 1 and 2) can represent generally any combination of circuitry and executable instructions to allow impersonation to extend to end points and services associated with a service. For example, the system 300 can authorize impersonation to a second service 344 when a related first service 342 is designated as authorized in an agency relationship between a principal (e.g. user) and an agent (e.g. service account). The system 300 can include an authority engine 304, a duty engine 306, a termination engine 308, an audit 310, and a liability engine 312 that are the same as the authority engine 104, the duty engine 106, the termination engine 108, the audit engine 110, and the liability engine 112 of FIG. 1, respectively, and the associated descriptions are not repeated for brevity. As shown in FIG. 3, the system 300 can include a portal engine 314. The engines 304, 306, 308, 310, 312, and 314 can be integrated into a compute device such as a service device 344. The engines 304, 306, 308, 310, 312, and 314 can be integrated via circuitry or as installed instructions into a memory resource of the compute device.

The portal engine 314 represents any circuitry or combination of circuitry and executable instructions to interface with a portal to manage a catalog of services. For example, the portal can be a web portal (i.e. a web site that functions as an entry point) having a graphics that represent services of the catalog of services and the catalog can include a plurality of IT services. The portal can manage and cause to present account information, such as user information and services associated with the account. For example, a user of the portal can retrieve a list of services authorized by the account and a history of actions taken by the account using the audit engine 310 and the liability engine 312. The portal can provide an interface for service and manage service-specific accounts. For example, the portal can act a service broker entry point to access services by providing end points for selected services and services related to the selected services.

The example environment 390 can include compute devices, such as service devices 334 and user devices 336. The service devices 334 represent generally any compute devices to respond to a network request received from a user device 336, whether virtual or real. For example, the service device 334 can operate a combination of circuitry and executable instructions to provide a network packet in response to a request for a page or functionality of an application. A service can be offered via a service device 334, such as a first service 342. For example, an IT service and stored onto a web server, such as a service device 334. The user devices 336 represent generally any compute devices with a combination of circuitry and executable instructions to communicate a network request and receive and/or process the corresponding responses. For example, a browser application may be installed on the user device 336 to receive the network packet from the service device 334 and utilize the payload of the packet to display an element of a page associated with a service via the browser application.

The compute devices can be located on separate networks 330 or part of the same network 330. The example environment 390 can include any appropriate number of networks 330 and any number of the networks 330 can include a cloud compute environment. For example, networks 330 can be distributed networks comprising virtual computing resources or "clouds." Any appropriate combination of the system 300 and compute devices can be a virtual instance of a resource of a virtual shared pool of resources. The engines and/or modules of the system 300 herein can reside and/or execute "on the cloud" (e.g. reside and/or execute on a virtual shared pool of resources).

A link 338 generally represents one or a combination of a cable, wireless connection, fiber optic connection, or remote connections via a telecommunications link, an infrared link, a radio frequency link, or any other connectors of systems that provide electronic communication. The link 338 can include, at least in part, intranet, the Internet, or a combination of both. The link 338 can also include intermediate proxies, routers, switches, load balancers, and the like.

Referring to FIGS. 1-3, the engines 104, 106, 108, 110, and 112 of FIG. 1 and/or the modules 204, 206, 208, 210, and 212 of FIG. 2 can be distributed across devices 334 and 336, or a combination thereof. The engine and/or modules can complete or assist completion of operations performed in describing another engine and/or module. For example, the duty engine 306 of FIG. 3 can request, complete, or perform the methods or operations described with the duty engine 106 of FIG. 1 as well as the termination engine 108 and the liability engine 312 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. The engines of the system 300 can perform example methods described in connection with FIGS. 4-6.

Figure 4A:
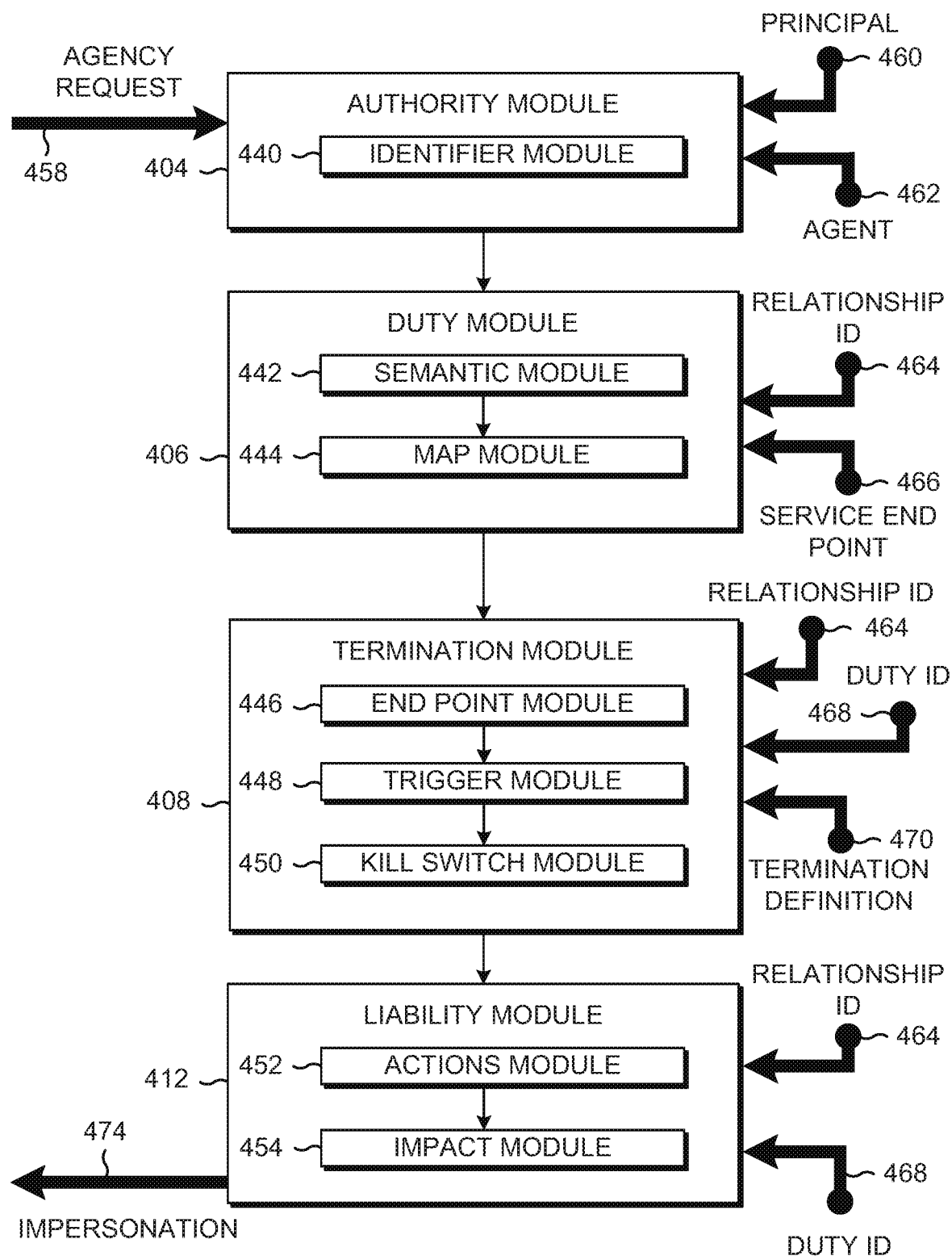
FIGS. 4A and 4B depict example modules used to implement example identity management systems.
Figure 4B:
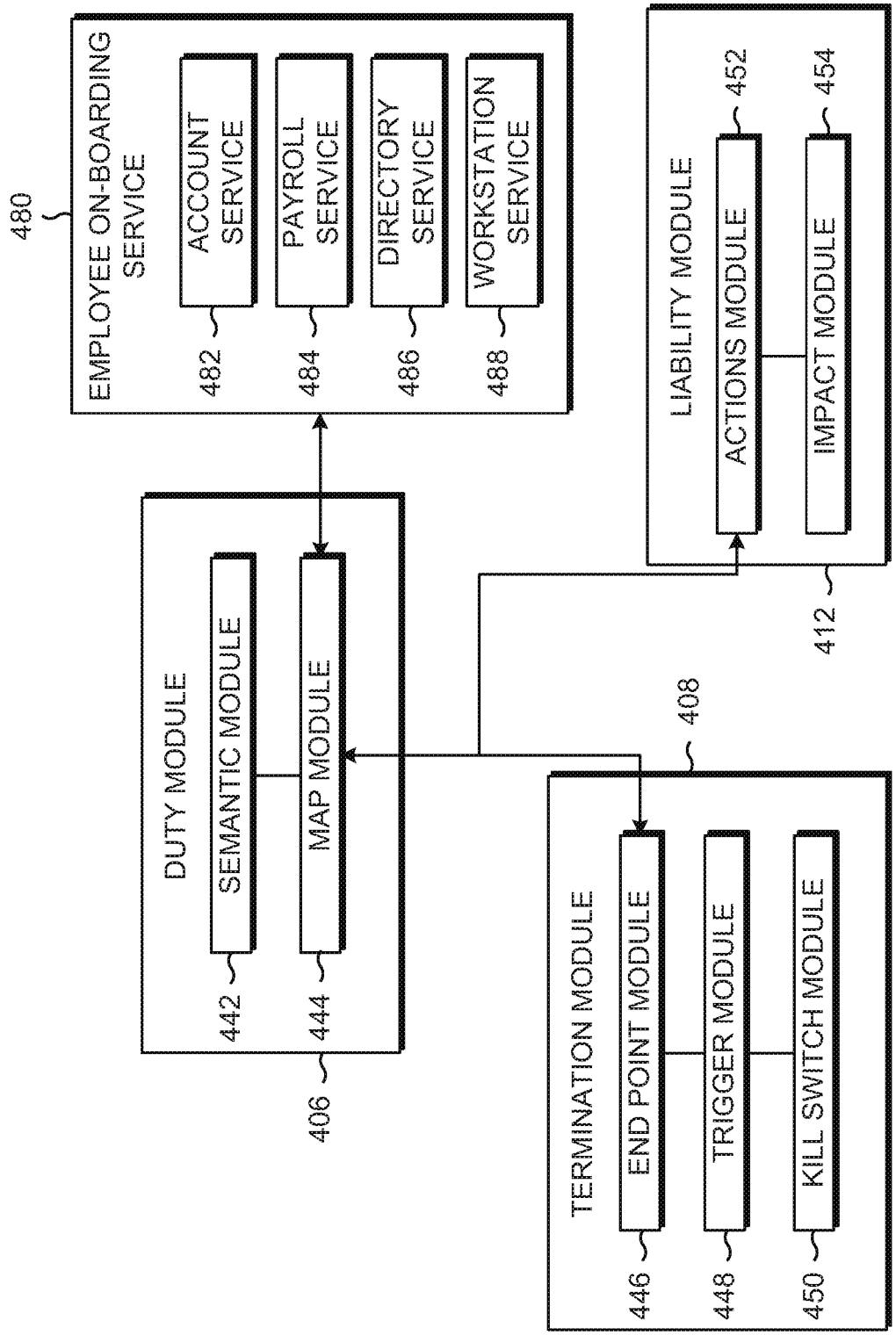

FIGS. 4A and 4B depict example modules used to implement example identity management systems. Referring to FIG. 4A, the example modules of FIG. 4A generally include an authority module 404, a duty module 406, a termination module 408, and a liability module 412. The example modules of FIG. 4A can be implemented on service device to provide ostensible impersonation for a catalog of services. In general, FIG. 4A examples part of an agency relationship flow starting with the creation of authority and then proceeding to granting duties, defining termination, and calculating liabilities. Auditing (not shown) can be another part of the agency relationship flow.

The authority module 404 can identify a relationship based on receiving an agency request 458. The authority module 404 can create an impersonation authority for an identity based on defining both a principal 460 and the agent 462. The authority module 404 can include program instructions, such as an identifier module, to create an identifier 464 associated with the authority relationship between the principal 460 and the agent 462. In this manner, the system can identify which relationship is acting based on the identifier 464.

The relationship identifier 464 can be received by the duty module 406 to determine a duty to grant to the agent 462 (e.g. associate a service and/or action allowed with an authority relationship). The duty module 406 can receive a service end point 466 and process the service end point 466 using program instructions, such as the semantic module 442 and the map module 444, to identify services, end points, and actions that are related and/or potentially related to the service end point 466. The semantic module 442 can interpret the associated services based on the semantics (e.g. keywords, phrases, and meanings thereof represented by a language structure) of the agency request 458. The map module 444 can represent a map that may be maintained and/or received by the duty module 406 where the map contains a data structure capable of providing a connection between a first service end point and a second service end point, such as via reference pointer to a service data structure. For example, the map may organize services in a tree form where a root request can have dependent function or modular requests that may be service-specific. The duty module 406 may receive multiple service end points 466 and iteratively or recursively identify potential services that may be used in connection with the multiple service end points.

The termination module 408 can identify a termination condition and a termination end point for the principal 460 to end the agency relationship with the agency 462. The termination module 408 can receive the relationship identifier 464, the duty identifier 468, and a termination definition 470 to determine a termination context (i.e. the state of operation at which termination would be appropriate based on the agency relationship). The termination definition 470 can be provided in a termination data structure. The termination data structure can include a service end point 466 and a termination condition associated with a termination end point. The termination module 408 can include program instructions, such as an end point module 446, a trigger module 448, and a kill switch module 450, to facilitate defining termination for the agency relationship. The end point module 446 represents program instruction to cause a processor resource to identify a termination end point. For example, the termination end point can be an administrative end point separate from the service. The termination end point can be identified by an administrator and/or determined by the trigger provided in the termination definition. The trigger module 448 represents program instructions that cause a processor resource to identify a condition (e.g. state of operation of the system) that qualifies as termination based on the agency relationship and the duties performable within the agency relationship. The kill switch module 450 represents program instructions to cause a processor to end the agency relationship and/or actions associated with the agency relationship.

The liability module 412 can identify the extended ability of an agent 462 to act on behalf of the principal 460 based on the agency relationship identifier 464 and duty identifier 468 associated with the agency relationship. For example, with the end points determined by the duty module 406, the liability module 412 can calculate the actions performable at each end point within the agency relationship and the impact of those actions. The liability module 412 can include program instructions, such as an action module 452 to identify allowable actions at a given end point and an impact module 454 to identify the impact of an action taken at an end point. The liability module 412 can produce a report listing all the allowable actions performable within the limitations of the agency relationship. Once the calculation actions and impact, defining termination, and granting duties to an agency relationship are performed, the impersonation 474 can be allowed by the agency on behalf of the principal 460. The actions of the agent 462 during impersonation 474 can be further monitored according to the termination conditions and impact calculated.

In the realization of IT services, such as the on-boarding of a new employee, the agent service can act on behalf of the impersonates across multiple fulfillment engines without losing the fidelity for detailed auditing and permissions. Referring FIG. 4B, an example of an employee on-boarding service 480 is shown as a designated service, such as a service selected at a web portal. The employee on-boarding service 480 can contain, require access, or otherwise be related to other services. For example, the employee on-boarding service can provision new accounts, configure payrolls systems, setup email, ship laptops, phones, and setup access to numerous other services. As shown in FIG.

4B, the employee on-boarding service 480 is related to an account service 482 to establish a profile for employee services, a payroll service 484 to establish payroll for monthly paychecks, a directory service 486 to create a phone number and email address to contact the on-boarding employee, and a workstation service 488 to cause a workstation to be ordered for the on-boarding employee to perform their role at the company. Each of these activities is to be performed on the behalf of the manager over the employee (in this example, the manager is the principal). As such, the authorization of the principal to on-board the employee is extended across connected or otherwise related systems. Without using ostensible authorization, the fidelity of auditing may be lost and the delegate may not correlate the services to the proper user.

In order to properly act on behalf of a given user across the multiple fulfillment engines, the duty engine 406 can map each of the service end points for a given macro-service (i.e. a service that entails the use of other services). As shown in FIG. 4B, the macro-service (e.g. the employee on-boarding service) and service boundaries are loaded into the duty module 406. This allows each of the sub-services connected to a macro service to be properly modeled. The duty module 406 provides the service map and definitions to the liability engine 412 for calculation of services, end points, and impact and display of that information, such as at a web portal. The service definition that is loaded into the duty engine 406 includes a designated service and the relationship that one service has to other services. The end points are supplied to the termination engine 408 and the termination engine 408 can return a termination end point, such as return the termination end point for access by the principal via a web portal.

In order to calculate the liability implied by an agency relationship, the service map of a given delegation is modeled and loaded into the duty engine 406 to provide the modeled service for calculation of liability by the liability engine 412. The agency service can include a service boundary definition that allows for the calculation of interconnected services. This service boundary definition maps the given provided APIs for a service and the APIs that the service consumes. For example, using a macro-service of a software development service, the subscription of a cloud service would use the liability engine 412 to calculate potential delegated authority before the service is provisioned. In this example, a development platform can be provisioned for the end user, and the end user can delegate authority to the automated fulfillment system in order to realize the cloud service. The end user can log into and use the provisioned systems when the service has been delegated on behalf of the end user. For example, the service could provision a virtual machine, an operating system, a database, and an application, server, where each of those services is done by an automated system on behalf of the end user (e.g. initiated by an agent account authorized by the end user) and maintain correct permissions.

When the end user is preparing to subscribe to the service, the liability engine 412 can calculate and display the implied liability of the service realization. In the previous example, the liability is that the end user is allowing the fulfillment system to provision a virtual machine, install a certain operating system, a certain application server, and a database; calculation and display of such liability gives the end user the opportunity to determine if each of the actions should be done. For example, it is possible that a policy for the user's company prohibits certain databases or displaying of information and providing liability of fulfillment (based on ostensible calculations) can prevent those potential violations of such a policy.

Figure 5:
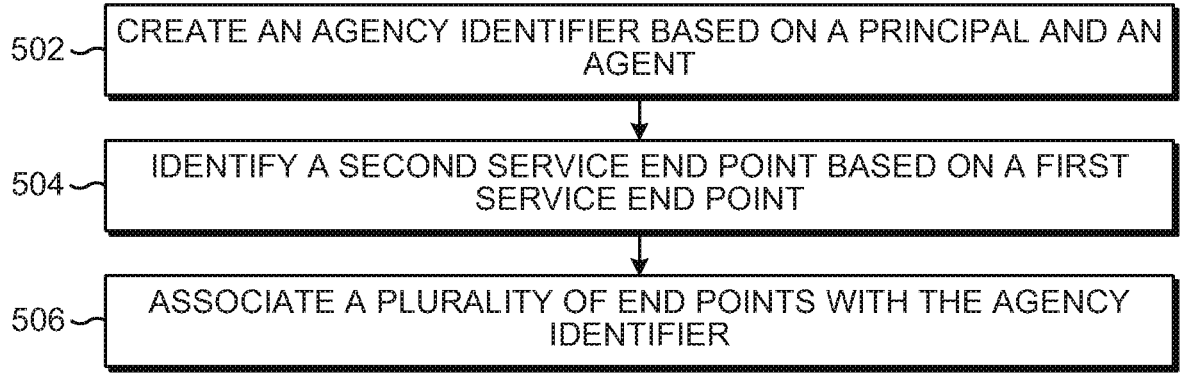
FIGS. 5 and 6 are flow diagrams depicting example methods of ostensible impersonation.
Figure 6:
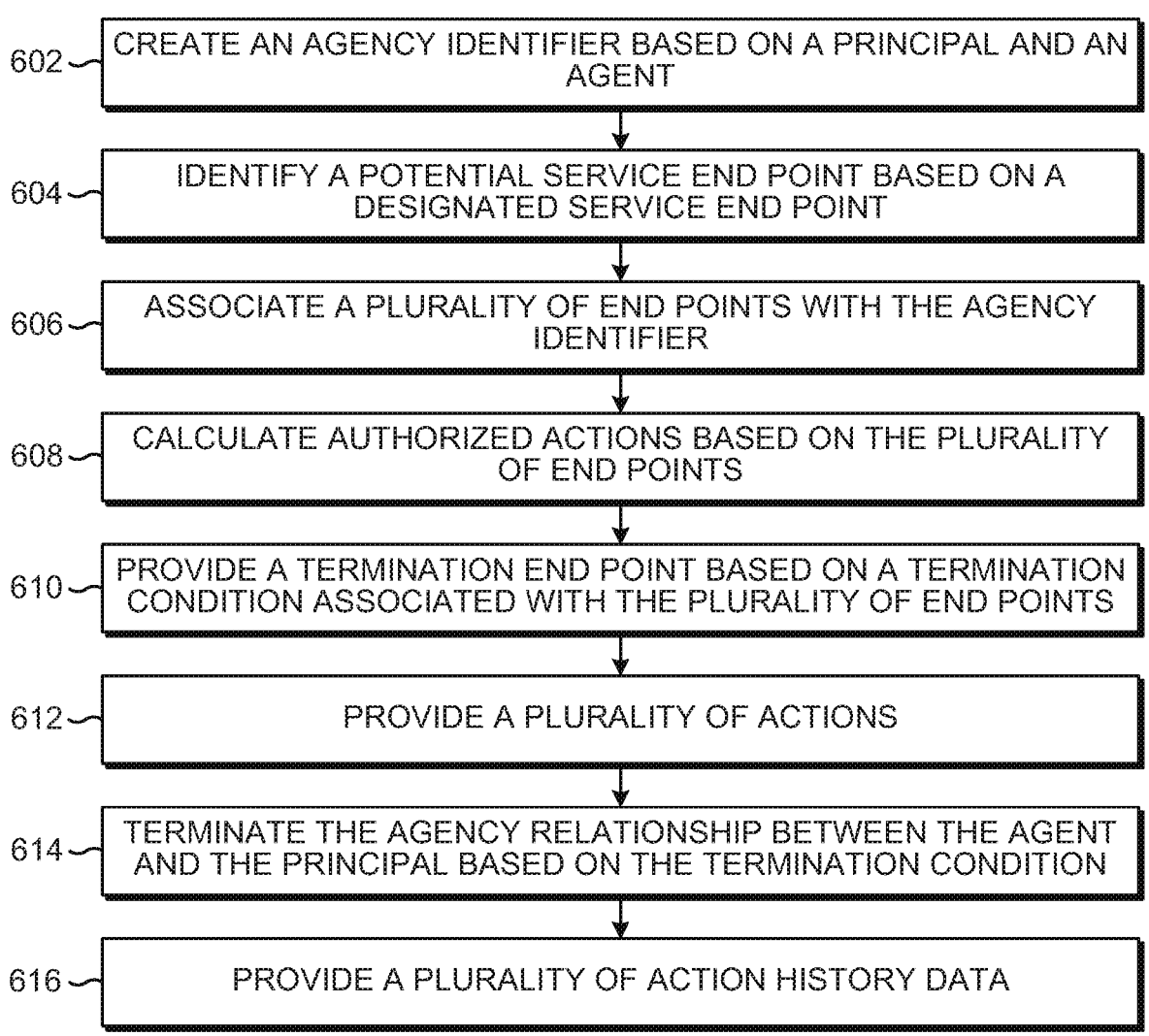

FIGS. 5 and 6 are flow diagrams depicting example methods for ostensible impersonation. Referring to FIG. 5, example methods for ostensible impersonation can generally comprise creating an agency relationship identifier, identifying a second service end point based on a first service end point, and associate a plurality of end points with the agency relationship identifier.

At block 502, an agency identifier is created based on a principal and an agent. For example, a user can select a service of a catalog offered at a portal and the portal can cause a relationship to be created between the user and an account for the selected service. A first end point can be received or determined from the agency identifier (e.g. the original service selection) and a second end point can be identified based on the first end point at block 504 (e.g. a second service is identified). The first end point is separate from the service of the second end point and related to the service at the second end point. For example, a first service end point can be designated with the agent and principal at block 502 and a second service related to the first service can be identified and the service end point associated with the second service can be made available. Additional end points for the service (e.g. a third end point, fourth end point, etc.) can be identified and mapped back to the first end point in the same fashion as the relationship between the first end point and the second end point. In this manner, any number of interconnected services can be authorized for interaction by the agent based on the agency relationship. The first service end point can be a designated service end point and the second service end point can be a potential service end point based on the designated service end point. A potential service end point can be determined based on a map from the designated service end point (e.g. the destination of the service for which the agency relationship was created). The map can be based on a composite data structure of service end points to known related service end points and/or based on semantics. For example, a designated service destination can be mapped to a potential service destination based on the semantics of a service selection made at the creations of a service account by the principal. A service end point can be identified based on a certificate associated with an action for an end point of a plurality of end points.

With the second service end point identified, a plurality of end points (including the first and second end points) is associated with the agency identifier a block 506. In this manner, services ancillary or otherwise related to the designated service for the agency relationship can be added to the allowable end points for impersonation and an agent service account can act congruent with agency principles on behalf of a principal service account. For example, a duty can be granted to an agency identifier based on a URL with an action on the URL. Example URL and hypertext markup language ("HTML") action methods include a URL request using a PUT method, a POST method, a GET method, and/or a DELETE method. This can allow the impersonator to create accounts or fulfill other intermediary or ancillary services associated with the service that was requested to be fulfilled based on the agency relationship. A certificate of authorization can be received based on the authority relationship between the first entity (e.g. principal) and the second entity (e.g. agent) and can define and/or limit the agency relationship associated with the agency identifier.

The plurality of end points can be defined using a mapping, such as a data structure describing one end point as mapable to many end points.

FIG. 6 includes blocks similar to blocks of FIG. 5 and provides additional blocks and details. In particular, FIG. 6 depicts additional blocks and details generally regarding calculating authorized actions based on a plurality of end points, providing a termination end point, terminating the agency relationship, and auditing. Blocks 602, 604, and 606 are the same as blocks 502, 504, and 506 of FIG. 5 and, for brevity, their respective descriptions are not been repeated.

Once a plurality of services (i.e. a plurality of service end points) are associated with an agency relationship, authorized actions on behalf of the principal and performable by the agent are calculated based on the plurality of services associated with the agency relationship (i.e. associated with the agency identifier) at block 608. At block 610, a termination end point is provided based on a termination condition associated with the plurality of service end points. For example, a notification can be sent to a first entity with information regarding cancellation process of the agency relationship, such as information providing a termination service, and the end point related to the termination service can be activated and provided to the principal based on an action of an agent satisfying a termination condition. A termination condition can include a maximum relationship age (e.g. a maximum time period to permit the agent to act within the authority relationship may be received with or part of the termination data structure).

At block 612, a plurality of actions is provided to an entity, such as the agent and/or the principal. For example, the plurality of actions can include authorized actions and actions that would activate a termination condition. For another example, the plurality of actions can be provided as a report delimiting the allowed impersonation of the principal by the agent. The plurality of actions can be formatted based on the plurality of end points, such as separating the actions of each end point. The plurality of actions can be offered with a report of impact associated with the plurality of actions. The impact of the plurality of actions can be identified based on a plurality of action potential data structures, where each action potential data structure includes an action and a potential impact of the action.

At block 614, the agency relationship between the agent and the principal can be terminated based on the termination condition. For example, when a termination conditions is triggered, the principal can be notified, and upon arrival at the termination end point, the principal can elect to ratify a frolic by the agent or terminate the associated agency relationship. For another example, a termination data structure (including a termination conditions associated with a first end point of a plurality of end points) can be identified based on a duty identifier, an action request can be compared to the termination data structure (e.g. the authorized actions associated with a service destination), and a termination action can be performed when the request achieves the termination condition associated with the service destination based on the termination data structure.

At block 616, a plurality of action history data can be provided to an entity, such as the agent and/or the principal, based on the agency identifier. For example, a list of actions that led to termination of the agency relationship and/or a complete list of actions performed during the time of impersonation by the agent on behalf of the principal. For another example, a plurality of action history data structures can be maintained to include a service end point, an action, and a timestamp associated with the action at the end point.

Although the flow diagrams of FIGS. 4-6 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples. It is understood, however, that other forms, details, and examples may be made without departing from the spirit and scope of the following claims.

What is claimed is:

1. A system comprising:
 a processor; and
 a non-transitory storage medium storing instructions executable on the processor to:
  provide an agency identifier comprising a value identifying an authority relationship between a first identity and a second identity, the authority relationship comprising an authorization for a second entity identified by the second identity to access a first service on behalf of a first entity identified by the first identity;
  provide a duty identifier based on the agency identifier and a first end point of a plurality of end points, the first end point being a destination to access the first service, and the duty identifier to define an authorization to interact with the first service provided at the first end point;
  identify a second end point of the plurality of end points based on the first end point, the second end point being associated with a second service;
  associate an authority to access the second end point with the duty identifier, the duty identifier defining an authorization to interact with the second service provided at the second end point; and
  accessing the second service at the second end point based on the authority to access the second end point, the accessing of the second service comprising the second entity identified by the second identity accessing the second end point on behalf of the first entity identified by the first identity based on the authority relationship identified by the value of the agency identifier.

2. The system of claim 1, wherein the identifying of the second end point is based on one of:
 a mapping of the plurality of end points, each end point of the plurality of end points being associated with a respective service of a plurality of services;
 a semantic selection of services, the semantic selection of services to relate the first end point and the second end point based on a language structure.

3. The system of claim 1, wherein the instructions are executable on the processor to:
 provide a termination end point based on the agency identifier and a termination data structure, the termination data structure to include the first end point and a termination condition associated with the termination end point.

4. The system of claim 1, wherein the instructions are executable on the processor to:
 maintain a history of actions performed by the second entity identified by the second identity on behalf of the first entity identified by the first identity.

5. The system of claim 1, wherein the instructions are executable on the processor to:

provide an approved action of the first service and a potential impact based on the agency identifier and the duty identifier.

6. A non-transitory computer readable storage medium comprising instructions executable by a processor resource to:
identify a plurality of end points based on a service destination that provides a first service, the plurality of end points providing respective plural services in addition to the first service;
identify, using an agency identifier set to a value, an authority relationship between a first identity and a second identity, the authority relationship comprising an authorization for a second entity identified by the second identity to access a service on behalf of a first entity identified by the first identity;
associate the plurality of end points with the authority relationship between the first identity and the second identity using a duty identifier; and
associate an authority to access the plurality of end points based on the duty identifier; and
access the respective plural services provided by the plurality of end points based on the authority to access the plurality of end points, the accessing of the respective plural services comprising the second entity identified by the second identity accessing the respective plural services on behalf of the first entity identified by the first identity based on the authority relationship identified by the value of the agency identifier.

7. The non-transitory computer readable storage medium of claim 6, wherein the instructions are executable by the processor resource to:
generate the duty identifier based on the agency identifier.

8. The non-transitory computer readable storage medium of claim 6, wherein the instructions are executable by the processor resource to:
identify a first end point of the plurality of end points based on a certificate associated with an action of the first end point.

9. The non-transitory computer readable storage medium of claim 6, wherein the instructions are executable by the processor resource to:
identify a termination data structure based on the duty identifier, the termination data structure including a termination condition associated with a first end point of the plurality of end points;
compare a request to the termination data structure; and
perform a termination action in response to the request satisfying the termination condition.

10. The non-transitory computer readable storage medium of claim 9, wherein the termination action comprises:
sending a notification to the first entity identified by the first identity with information regarding a cancellation process of the agency identifier in response to the request satisfying the termination condition.

11. A method executed by a system comprising a processor, comprising:
creating an agency identifier that identifies an authority relationship between a first identity and a second identity, the authority relationship comprising an authorization for a second entity identified by the second identity to access a service on behalf of a first entity identified by the first identity;
identifying a potential service end point based on a designated service end point, the designated service end point providing a first service, and the potential service end point providing a second service;
accessing the second service provided by the potential service end point, the accessing of the second service comprising the second entity identified by the second identity accessing the second service on behalf of the first entity identified by the first identity based on the authority relationship;
associating a plurality of end points with the agency identifier, the plurality of end points including the designated service end point and the potential service end point;
calculating authorized actions based on the plurality of end points associated with the agency identifier; and
providing a termination end point based on a termination condition associated with one of the plurality of end points.

12. The method of claim 11, comprising:
receiving a uniform resource locator and an action using one method from the group consisting of a PUT, a POST, a GET, and a DELETE;
receiving a certificate of authorization based on the authority relationship between the second identity and the first identity;
receiving a termination definition data structure, the termination definition data structure including the plurality of end points and a plurality of termination conditions;
receiving a maximum time period to permit the authorized actions of the authority relationship.

13. The method of claim 11, comprising:
terminating the authorization relationship between the second identity and the first identity based on the termination condition.

14. The method of claim 11, comprising:
providing a formatted plurality of actions based on the plurality of end points, the formatted plurality of actions to delimit an allowed impersonation of the first entity by the second entity based on a formatted plurality of action potential data structures including an action and potential impact of the action.

15. The method of claim 11, comprising:
providing a plurality of action history data structures performed by the second entity identified by the second identity on behalf of the first entity identified by the first identity based on the agency identifier, the plurality of action history data structures including a service end point, an action, and a timestamp.

16. The system of claim 1, wherein the instructions are executable to:
receive selection by a user of the first service from a plurality of services presented through a portal, wherein the first identity identifies the user, and the second identity identifies an agent that accesses the second end point on behalf of the user,
wherein the associating of the authority to access the second end point with the duty identifier extends the authorization to access the first service on behalf of the user to the second service that is related to the first service.

17. The system of claim 1, wherein the associating of the authority to access the second end point with the duty identifier extends the authorization to access the first service on behalf of the first identity to the second service that is related to the first service.

18. The system of claim 1, wherein the second entity identified by the second identity impersonates the first entity identified by the first identity when accessing the second end point.

19. The non-transitory computer readable storage medium of claim 6, wherein the respective plural services comprise information technology (IT) services.

20. The method of claim 11, further comprising:
- receiving selection by a user of the first service from a plurality of services presented through a portal, wherein the first identity identifies the user, and the second identity identifies an agent that accesses the second service on behalf of the user; and
- associating an authority to access the second service to extend an authorization to access the first service on behalf of the user to the second service that is related to the first service.

* * * * *